United States Patent
Sherry et al.

(10) Patent No.: US 12,474,818 B2
(45) Date of Patent: Nov. 18, 2025

(54) CUSTOMIZED GRAPHICAL USER INTERFACE ACCESS SYSTEMS GRAPHICALLY DEPICTING ICONS

(71) Applicant: Truist Bank, Charlotte, NC (US)

(72) Inventors: John Peter Sherry, Charlotte, NC (US); Daria Hadalski, Fayetteville, GA (US); Zachary Samuel Sink, High Point, NC (US); Laura Jeanette Smith, Richmond, VA (US)

(73) Assignee: TRUIST BANK, Charlotte, NC (US)

( * ) Notice: Subject to any disclaimer, the term of this patent is extended or adjusted under 35 U.S.C. 154(b) by 143 days.

(21) Appl. No.: 18/523,051

(22) Filed: Nov. 29, 2023

(65) Prior Publication Data

US 2025/0173040 A1 May 29, 2025

(51) Int. Cl.
| | |
|---|---|
| *G06F 3/04817* | (2022.01) |
| *G06F 3/04842* | (2022.01) |
| *G06F 21/36* | (2013.01) |
| *G06F 40/174* | (2020.01) |

(52) U.S. Cl.
CPC ...... *G06F 3/04817* (2013.01); *G06F 3/04842* (2013.01); *G06F 21/36* (2013.01); *G06F 40/174* (2020.01)

(58) Field of Classification Search
CPC .................................................. G06F 3/04817
USPC ....................................................... 715/743
See application file for complete search history.

(56) References Cited

U.S. PATENT DOCUMENTS

| | | | | |
|---|---|---|---|---|
| 5,774,716 | A  * | 6/1998 | Harbinski | G06F 16/2358 |
| 8,628,331 | B1 * | 1/2014 | Wright | G09B 19/00 |
| | | | | 434/323 |
| 10,719,660 | B1 * | 7/2020 | Howard | G06F 3/04817 |
| 11,146,599 | B1 * | 10/2021 | Jackson | H04L 12/1827 |
| 11,756,096 | B1 * | 9/2023 | Saad | G06Q 30/0623 |
| | | | | 705/26.7 |
| 12,094,018 | B1 * | 9/2024 | O'Malley | G06N 20/00 |
| 12,148,030 | B1 * | 11/2024 | Best | H04W 68/005 |
| 2001/0032178 | A1 * | 10/2001 | Adams | G06Q 40/08 |
| | | | | 705/42 |
| 2002/0069160 | A1 * | 6/2002 | Olin | G06Q 40/00 |
| | | | | 705/36 R |
| 2004/0034592 | A1 * | 2/2004 | Hu | G06Q 40/03 |
| | | | | 705/38 |

(Continued)

*Primary Examiner* — Reza Nabi
(74) *Attorney, Agent, or Firm* — Michael A. Springs, Esq.; Shumaker, Loop & Kendrick, LLP; Patrick B. Horne

(57) ABSTRACT

Systems and methods receive, via a GUI, and process input data of input(s) indicating a user's need for an entity object accessible via an entity, the input(s) being provided based on selected user interface component(s) depicted via the GUI, the entity object being personalized for the user. A request for the entity object is transmitted across a network and from the computing device to a backend system. At least two personalized entity object options initially determined to be available to the user are received, via the network and from the backend system, where each of the at least two personalized entity objects includes respective attributes customized based on user data of the user. Two or more of the personalized entity objects are displayed, where each includes at least one graphical icon for user customization, and at least one of the displayed personalized entity objects appears visually differentiated.

19 Claims, 9 Drawing Sheets

(56) References Cited

U.S. PATENT DOCUMENTS

| | | | |
|---|---|---|---|
| 2005/0289046 A1* | 12/2005 | Conyack, Jr. | G06Q 40/03 705/38 |
| 2007/0043654 A1* | 2/2007 | Libman | G06Q 40/03 705/38 |
| 2008/0059352 A1* | 3/2008 | Chandran | G06Q 40/03 705/35 |
| 2008/0086750 A1* | 4/2008 | Yasrebi | H04L 67/306 348/E7.071 |
| 2008/0120129 A1* | 5/2008 | Seubert | G06Q 40/125 705/305 |
| 2009/0083173 A1* | 3/2009 | Hu | G06Q 40/03 705/35 |
| 2012/0072336 A1* | 3/2012 | Le Vine | G06Q 40/02 705/38 |
| 2012/0095819 A1* | 4/2012 | Li | G06Q 30/02 705/14.23 |
| 2012/0284105 A1* | 11/2012 | Li | G06Q 30/02 705/14.23 |
| 2012/0317016 A1 | 12/2012 | Hughes | |
| 2013/0312087 A1* | 11/2013 | Latzina | G06F 21/629 726/19 |
| 2014/0164238 A1 | 6/2014 | Hoyer | |
| 2015/0026038 A1* | 1/2015 | Alsbrooks | G06Q 40/03 705/38 |
| 2015/0189368 A1* | 7/2015 | Lee | H04N 21/8456 725/37 |
| 2016/0262316 A1* | 9/2016 | Woolbright | A01G 9/025 |
| 2016/0371770 A1* | 12/2016 | Porter | G06F 16/2379 |
| 2017/0138013 A1* | 5/2017 | Woolbright | E02D 29/0225 |
| 2017/0193545 A1* | 7/2017 | Zhou | G06Q 30/0254 |
| 2017/0235848 A1* | 8/2017 | Van Dusen | G06Q 30/0201 705/12 |
| 2018/0268455 A1 | 9/2018 | Shiely | |
| 2019/0012318 A1 | 1/2019 | Templain | |
| 2019/0311429 A1* | 10/2019 | Barkas | G06Q 40/03 |
| 2019/0325084 A1* | 10/2019 | Peng | G10L 15/063 |
| 2021/0098120 A1* | 4/2021 | Kshirsagar | G06Q 10/06398 |
| 2021/0392227 A1* | 12/2021 | Li | H04M 3/2218 |
| 2021/0407012 A1 | 12/2021 | Silva | |
| 2023/0124849 A1* | 4/2023 | Wright | G06Q 40/03 705/37 |
| 2024/0005386 A1* | 1/2024 | Thurairatnam | G06Q 20/02 |
| 2024/0378666 A1* | 11/2024 | Freed | G06Q 40/03 |
| 2025/0156297 A1 | 5/2025 | Ghosh | |
| 2025/0173040 A1* | 5/2025 | Sherry | G06F 3/04817 |
| 2025/0173047 A1* | 5/2025 | Sherry | G06F 3/04817 |
| 2025/0173048 A1* | 5/2025 | Sherry | G06F 9/451 |
| 2025/0173166 A1* | 5/2025 | Sherry | H04L 67/306 |
| 2025/0173347 A1* | 5/2025 | Sherry | G06F 16/24578 |

\* cited by examiner

ACCESS USER DATA OF A USER THAT UTILIZES ONE OR MORE ENTITY OBJECTS, WHEREIN THE USER DATA COMPRISES BOTH ATTRIBUTE DATA ASSOCIATED WITH ONE OR MORE ATTRIBUTES OF THE USER AND RESOURCE DATA ASSOCIATED WITH A RESOURCE CURRENTLY POSSESSED BY THE USER
505

↓

ANALYZE THE USER DATA TO IDENTIFY AT LEAST TWO ENTITY OBJECTS THAT ARE AVAILABLE TO THE USER AND BASED THEREON ASSIGN A RESPECTIVE VALUE TO EACH RESPECTIVE ENTITY OBJECT OF THE AT LEAST TWO ENTITY OBJECTS, WHEREIN THE VALUE ASSIGNED IS BASED AT LEAST IN PART ON A HISTORY OF USER ACTIONS
510

↓

RANK THE AT LEAST TWO ENTITY OBJECTS BASED ON THE RESPECTIVE VALUE ASSIGNED TO EACH RESPECTIVE ENTITY OBJECT
515

↓

INITIATE DISPLAYING, VIA A USER INTERFACE OF A USER DEVICE, A GRAPHICAL USER INTERFACE COMPRISING THE ONE OR MORE GRAPHICAL USER INTERFACE COMPONENTS, WHEREIN THE ONE OR MORE GRAPHICAL USER INTERFACE COMPONENTS INCLUDE RESPECTIVE INPUTS ASSOCIATED WITH EACH RESPECTIVE ENTITY OBJECT, WHEREIN THE GRAPHICAL USER INTERFACE COMPRISES A FEATURED ENTITY OBJECT OF THE AT LEAST TWO ENTITY OBJECTS, THE FEATURED ENTITY OBJECT HAVING A RELATIVELY HIGHER VALUE COMPARED TO ANY OTHER ENTITY OBJECT OF THE AT LEAST TWO ENTITY OBJECTS
520

FIG. 5

CUSTOMIZED GRAPHICAL USER INTERFACE ACCESS SYSTEMS GRAPHICALLY DEPICTING ICONS

This invention relates generally to the field of graphical user interfaces, and more particularly embodiments of the invention relate to customized graphical user interface generation.

BACKGROUND OF THE INVENTION

Existing digital object origination processes can often discourage users who wish to obtain entity products if the user applies for an entity product that the user would not be eligible to obtain. In addition, users often submit digital originations on products when there are other products that would be better suited for the needs based on various conditions. Thus, a need exists for improved systems and methods for helping users identify entity products that not only fit the user's needs but that the user would be eligible to obtain prior to completing a digital origination process.

BRIEF SUMMARY

Shortcomings of the prior art are overcome and additional advantages are provided through the provision of a computing system for customized graphical user interface access graphically depicting at least one icon. The system includes at least one processor, a communication interface communicatively coupled to the at least one processor, and a memory device storing executable code. When the executable code is executed, it causes the at least one processor to, at least in part, receive, via a graphical user interface, and process input data of one or more inputs indicating a user's need for an entity object accessible via an entity, wherein the one or more inputs are provided based on the user selecting one or more user interface input components depicted via the graphical user interface, wherein the entity object is to be personalized for the user. A request for the entity object is transmitted, across a network and from the computing device to a backend system, and at least two personalized entity object options initially determined to be available to the user are received, via the network from the backend system, wherein each of the at least two personalized entity objects comprise respective object attributes customized based on user data of the user. Two or more of the at least two personalized entity objects each including the at least one graphical icon for user customization are displayed, where at least one of the displayed two or more personalized entity objects appear visually differentiated from any other displayed entity objects. One or more user inputs are received, via the user device, to populate one or more documents required to apply for a desired entity object of the at least two personalized entity objects. User input data of the one or more user inputs is transmitted via the network to the backend system and an electronic communication indicating the user was declined as part of an underwriting process.

Additionally, disclosed herein is a computing system for displaying one or more graphical user interface icons. The system includes at least one processor, a communication interface communicatively coupled to the at least one processor, and a memory device storing executable code that, when executed, causes the at least one processor to, at least in part, receive, by a user device via a network from a backend system, object data of at least two personalized entity objects initially determined to be available to a user based on satisfying one or more eligibility criteria, wherein each of the at least two personalized entity objects comprise respective object attributes customized based on user data of the user. Two or more entity objects of the at least two personalized entity objects are displayed via a graphical user interface of the user device, where the displayed two or more entity objects each include respective icons of the one or more graphical user interface icons, and where one entity object of the two or more displayed entity objects is visually differentiated from any other entity object of the two or more displayed entity objects, the one entity object being differentiated based on comprising a higher score assigned thereto relative respective scores of any other entity object of the two or more displayed entity objects. One or more user inputs indicating selection of a respective icon of the respective icons is received, via the graphical user interface of the user device, where the one or more user inputs facilitating populating one or more documents required to apply for a desired entity object of the at least two personalized entity objects. The one or more documents are submitted for processing, and an indication is received that the user was ultimately declined for obtaining the desired entity object.

Also disclosed herein is a computer-implemented method for customized graphical user interface access graphically depicting at least one icon that includes, at least in part, receiving, via a graphical user interface, and process input data of one or more inputs indicating the user's need for an entity object accessible via an entity, wherein the one or more inputs are provided based on the user selecting one or more user interface input components depicted via the graphical user interface, wherein the entity object is to be personalized for the user. The method also includes transmitting, across a network and from the computing device to a backend system, a request for the entity object, and receiving, via the network from the backend system, at least two personalized entity object options initially determined to be available to the user, wherein each of the at least two personalized entity objects comprise respective object attributes customized based on user data of the user. The method also includes displaying, via the graphical user interface, two or more of the at least two personalized entity objects each comprising the at least one graphical icon for user customization, at least one of the displayed two or more personalized entity objects appearing visually differentiated from any other displayed entity objects. Further, the method includes receiving, via the user device, one or more user inputs to populate one or more documents required to apply for a desired entity object of the at least two personalized entity objects, and transmitting, via the network to the backend system, user input data of the one or more user inputs. In addition, an electronic communication is received from the backend system via the network and displayed via the graphical user interface, where the electronic communication indicates the user was declined as part of an underwriting process.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 2 depicts an example graphical user interface, in accordance with an embodiment of the present invention;

FIG. 5 depicts a block diagram of an example method for facilitating displaying one or more graphical user interface components, in accordance with an embodiment of the present invention;

DETAILED DESCRIPTION

Figure 1:
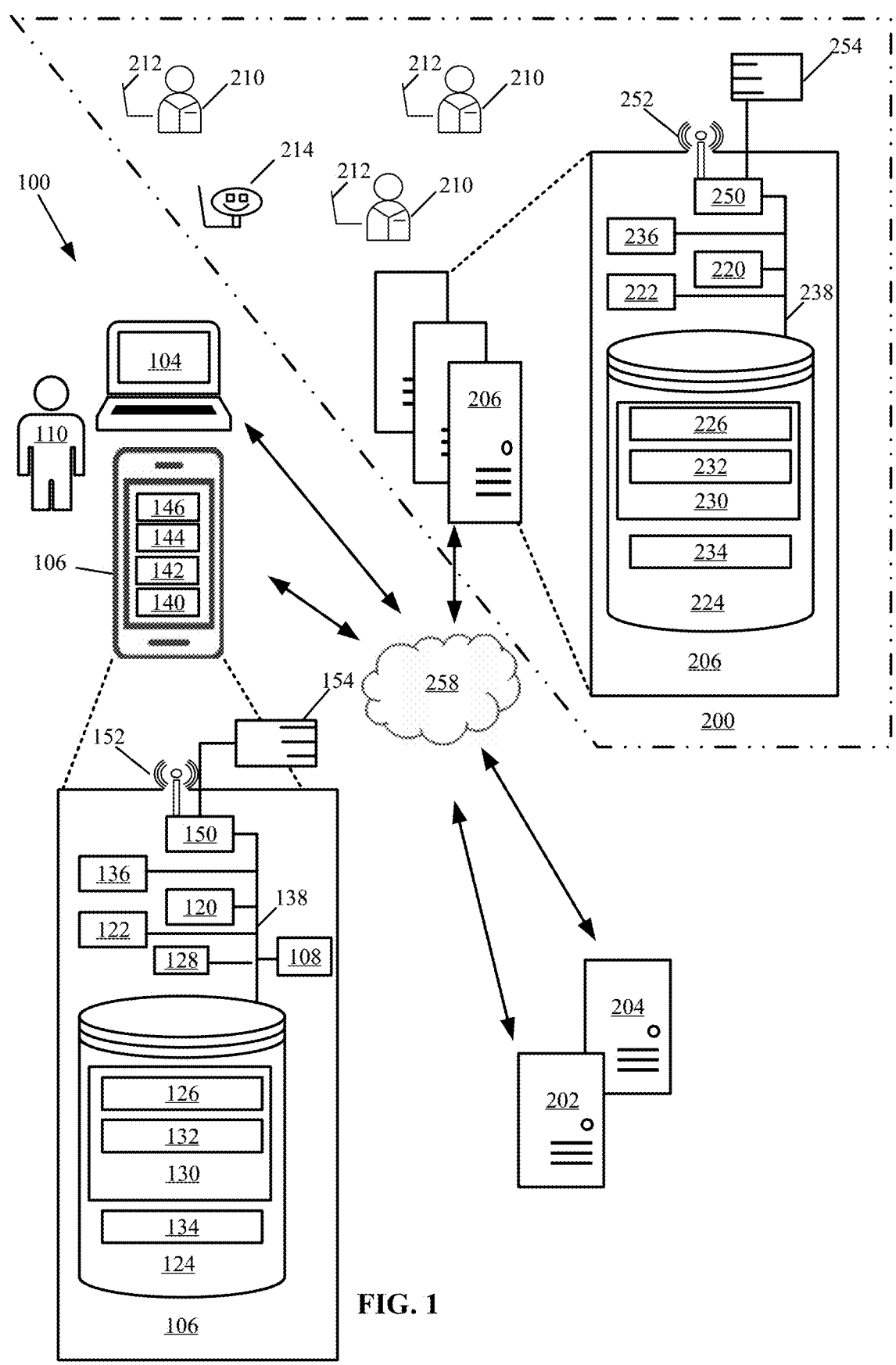
FIG. 1 illustrates an example computing environment for generating actionable graphical user interface input components to be depicted via a computer screen, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "couples," "coupling," "fixed," "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses computer systems that provide functionality for the disclosed systems and methods. In particular, the term "enterprise" may generally describe a person or business enterprise providing goods or services. Interactions between an enterprise system and a user device can be implemented as an interaction between a computing system of the enterprise, and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with another external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which be executed via the processor of the computer or other programmable data processing apparatus, create a means for implementing the functions/acts specified in the flowchart and/or block diagram block or blocks.

In one embodiment, these computer readable program instructions may also be stored in one or more computer-readable storage media that can direct a computer or other programmable data processing apparatus, and/or other devices, to function in a particular manger, such that a computer readable storage medium of the one or more computer-readable storage media having instructions stored therein comprises an article of manufacture including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks.

In another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

FIG. 1 illustrates a computing environment 100 that facilitates generating actionable graphical user interface input components to be depicted via a computer screen, according to at least one embodiment of the present invention. The computing environment 100 generally includes a user 110 (e.g., an employee of an enterprise) that benefits through use of services and products offered by the enterprise system 200. The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be any individual, a group, entity, etc. that is in possession of or has access to the user device 104, 106, which may be personal or public items. Although the user 110 may be singly represented in some figures, in at least in some embodiments the user 110 is one of many such that a group of users through multiple user devices utilize the computing environment 100 to communicate with the enterprise system 200.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory additionally or alternatively can include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application (e.g., a mobile application), collectively referred to herein as a "web portal". These applications also typically provide a graphical user interface (GUI) on the display 140 that allows the user 110 to communicate via the user device 104, 106 with, for example, an enterprise system 200, and/or other devices or systems. For instance, the GUI on the display 140 may include features for displaying information and accepting inputs from users, and may include fillable text boxes, data fields, hyperlinks, pull down menus, check boxes, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

According to one embodiment, the input and output system 136 may include an optical instrument (e.g., camera 146) configured to capture an image. For instance, the optical instrument may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In one embodiment, the input and output system 136 may also be configured to obtain and process various forms of authentication to obtain authentication information of a user 110 in order to provide, for example, access to a specific web portal of the enterprise system 200. For instance, the web portal may be accessed based on the user providing authentication information to log in to the web portal in order to perform various functionalities described herein. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a Global Positioning System (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

Computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more human agents 210, and as an input device by providing virtual buttons, selectable options, a virtual keyboard, and other indicia that, when touched or activated, control or prompt the agent device 212 by action of the human agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

The computing system 206 may have various components similar to the user device 104, 106. For instance, in one example the computing system 206 may include at least one of each of a processing device 220, and a memory device 222 for use by the processing device 220, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data and files, such as those for user accounts, user profiles, enterprise data, files downloaded or received from other devices, and other data items preferred by the user and/or enterprise or required or related to any or all of the applications or programs 230.

As illustrated, the computing system 206 includes an input/output system 236, which generally refers to, includes, and/or is operatively coupled with agent devices 212 and automated system(s) 214, as well as various other input and output devices. According to various embodiments, the computing system 206 may be used to distribute the digital data collection program as, for example a Software-as-a-Service (SaaS) that can be accessed by the user device 104, 106 on a subscription basis via a web browser or mobile application. SaaS may provide a user 110 with the capability to use applications running on a cloud infrastructure of the enterprise system 200, where the applications are accessible using the user device 104, 106 via a thin client interface such as a web browser and the user 110 is not permitted to manage or control the underlying cloud infrastructure (i.e., network, servers, operating systems, storage, or specific application capabilities that are not user-specific) of the enterprise system 200.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also, or alternatively, be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices 104, 106, the agent devices 212, computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of this description. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, frames using frame relay, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, third-party PaaS, third-party IaaS, external databases, business entities, banking systems, enterprises, organizations, institutions, companies, government entities, clubs, and groups of any size are all within the scope of the description. According to various embodiments, external systems 202 and 204 may utilize software applications that function using external resources that are available through a third-party provider such as SaaS, PaaS, or IaaS service models. Such external systems 202, 204 include the third party systems accessible via the agent devices 212 using a software application (e.g., an integrated mobile software application or an application programming interface (API) software application) that can be integrated with the computing system 206 to facilitate communication between software and systems and also configured to utilize different data formats between systems. In another embodiment, the third party system may be accessible by the agent devices 212 using a web-based software interface (e.g., a website).

In certain embodiments, one or more of the systems described herein such as the user device (referring to either or both of the computing device 104 and the mobile device 106), the enterprise system 200, and/or the external systems 202 and 204 are, include, or utilize virtual resources. Such virtual resources are or include cloud resources or virtual machines. The virtual resources may utilize a cloud-computing configuration to provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

The disclosed systems and methods provide enhanced systems and methods for digitally originating a borrowing product of the entity (e.g., a credit card, a personal loan, an auto loan, a business loan, a mortgage loan, a term loan, a home-equity loan, a student loan, a credit-builder loan, a payday loan, a debt consolidation loan, etc.), whether that borrowing product be secured, unsecured, etc. Advantageously, the disclosed systems and methods provide enhanced graphical user interfaces that are used to display customized and personalized information to a user. In particular, the disclosed systems and methods allow an entity to score users' ability to obtain any and every entity object simultaneously so that the user can be pre-approved for a subset of the entity objects based on eligibility. The graphical user interface displays the subset of the entity objects for which the user has obtained pre-approval so that the user will not be discouraged by applying for a singular entity object that the user would not be eligible to obtain. The disclosed systems and methods disrupt conventional processes in which a user first selects a single entity object (e.g., a credit card, a personal loan, an auto loan, a business loan, a mortgage loan, a term loan, a home-equity loan, a student loan, a credit-builder loan, a payday loan, a debt consolidation loan, etc.) and then submits an application for that specific product. If the user would not qualify for that product, it can be discouraging for the user, and the user may have to reapply for additional products. Thus, the disclosed systems and methods provide enhanced efficiency by removing steps typically taken in order to digitally originate an entity product. This improved efficiency provides an improvement to existing technical fields of data processing for users to obtain entity products. In addition, the disclosed systems and methods are implemented using a graphical user interface, which is a particular machine or manufacture that is integral for displaying interactive user interface input components.

In some embodiments, the enterprise system 200 generates a GUI using one or more integrated software applications such as an interaction interface software service. The GUI may depict icons that provide functionality for the user to access various entity information. In particular, a digital platform may be depicted that includes different views and functionalities for digitally originating an entity object. The GUI can depict entity objects with graphical elements, words, phrases, etc. that can show information related to the entity object.

Figure 2:
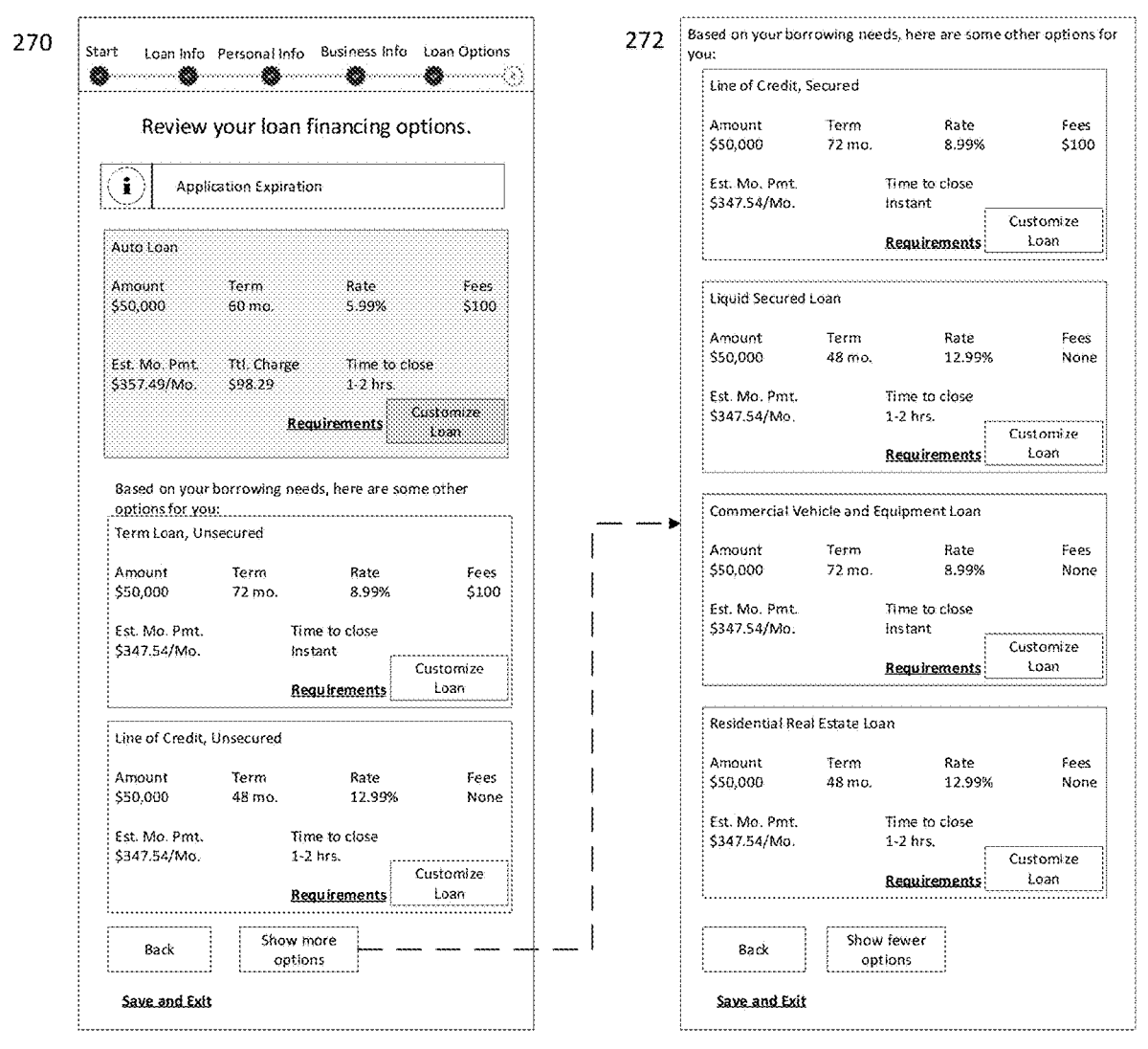

FIG. 2 depicts an example graphical user interface 270, in accordance with an embodiment of the present invention. The graphical user interface 270 may be made available to the user via a digital platform of an entity, where the graphical user interface 270 is used as part of a loan origination system (LOS). Further, the graphical user interface 270 provides personalization and customization to a user in order for the user to obtain an entity product. In one embodiment, the graphical user interface 270 depicts a progress bar indicating the progress made by the user in order to obtain an entity object. The graphical user interface 270 may also indicate that the entity objects available to the user are time sensitive such that the availability of the entity objects expires after a period of time. The graphical user interface 270 also depicts at least two entity objects determined to be available to the user based on the personal information and/or business information provided via the LOS. The LOS may be used to assign weights, perform ranking, and evaluate scores that attributed to various data in order to analyze risk associated with letting a user borrow resources. The LOS may be used to generate layout display data that controls how information is displayed via the graphical user interface 270.

In the non-limiting example depicted by graphical user interface 270, one optional entity object includes an auto loan, a second optional entity object includes an unsecured term loan, and a third optional entity object includes an unsecured line of credit. Each entity object has a plurality of attributes that are displayed in association with each respective entity object. For example, the auto-loan entity object indicates a loan amount of $50,000 for a term of 60 months at a rate of 5.99%, and indicates the amount of origination fees associated with obtaining the entity object. Further, an estimated monthly payment is also depicted along with a finance charge and an estimated time to close in order for the user to obtain the entity object. Selectable icons are also displayed that allow the user to access the requirements needed to obtain the entity object and customize the entity object.

A second example graphical user interface 272 is also depicted that is accessible when the user selects an input to show more options that would be available to the user. In this non-limiting example, additional entity objects that are depicted include a secured line of credit, a liquid secured loan, a commercial vehicle and equipment loan, and a residential real estate loan.

According to various embodiments, the user interface will include one or more icons or one or more control inputs that allow the user to modify the entity objects that are being visually displayed by the graphical user interface 272. Selection of these control input(s) enable the user to filter, sort, rank, or perform a side-by-side comparison of the entity object options available to the user. In one example, these control input(s) include an entity object filter, an entity object sorter, a display preferences option, and/or a rank input. Selection of the entity object filter enables the user to narrow a quantity of the entity objects being displayed based on various criteria (e.g., lowest payment amount, lowest interest rate, finance charge amount, time to fund, origination fees, total cost of the loan, etc.). Similarly, the entity object sorter enables the user to sort the entity objects based on an interest rate applied to each entity object, a one-time origination fee amount, a time to fund, a servicing or finance charge amount, and/or a payment amount. In another example, a single control input is depicted where selection of the control input causes a window to be displayed that allows the user to provide preferences on how to filter, sort, rank, or display a side-by-side comparison.

Figure 3:
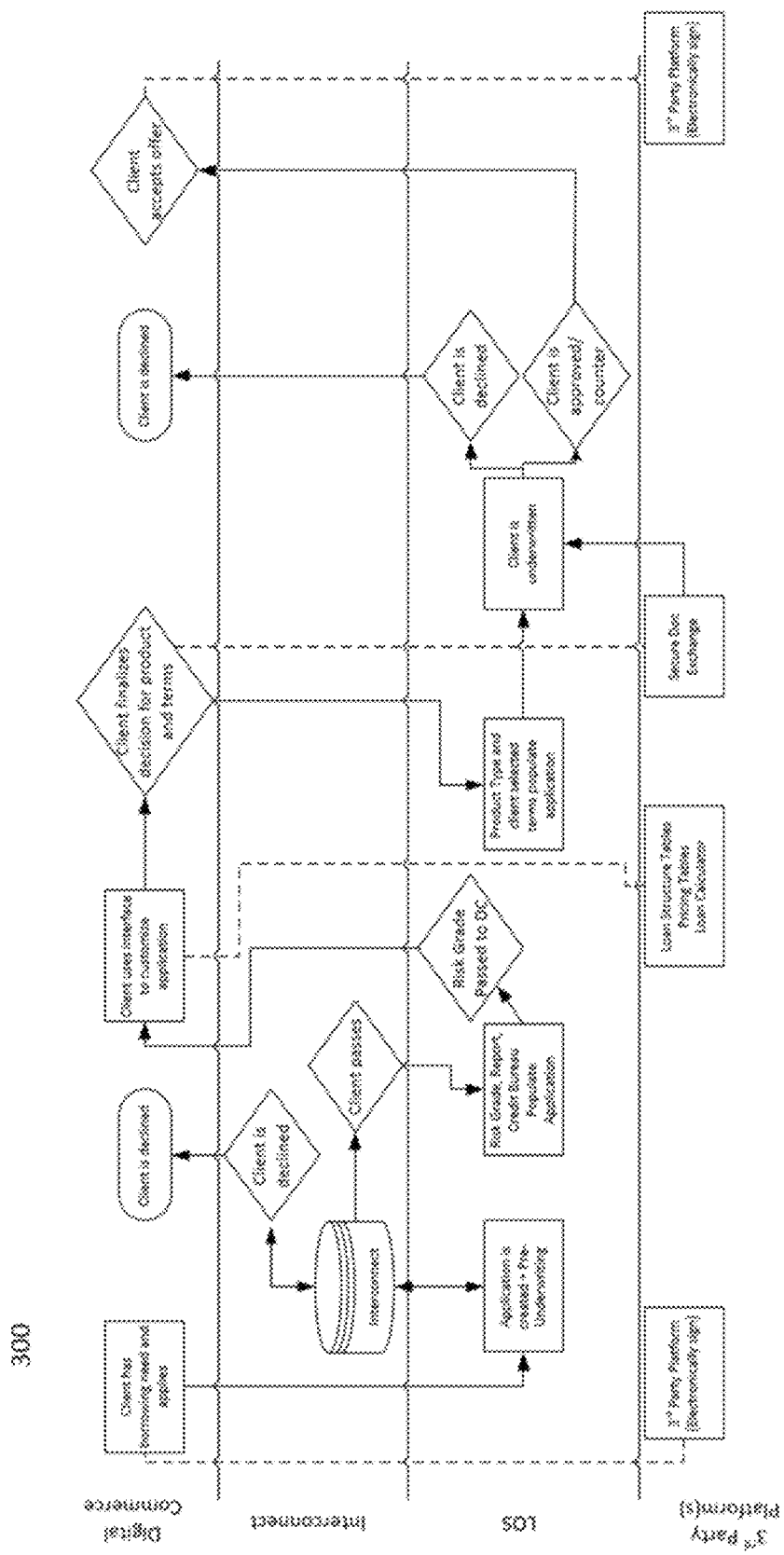
FIG. 3 depicts a flowchart of an example methodology, in accordance with an embodiment of the present invention.

FIG. 3 depicts a flowchart of an example methodology 300, in accordance with an embodiment of the present invention. When a client has a borrowing need, the client provides an indication that they need an entity object (e.g., a credit card, a personal loan, an auto loan, a business loan, a mortgage loan, a term loan, a home-equity loan, a student loan, a credit-builder loan, a payday loan, a debt consolidation loan, etc.) that enables the user to borrow resources. When the client submits the request, a third party platform is used in order to obtain an electronic signature that authenticates the request from the client in order to perform a credit check on the user and perform a pre-authorization and/or pre-underwriting process. Once the client authorizes the request, the LOS creates a loan application and performs pre-underwriting via an interconnect that is used to obtain client data and entity object data. If the client is not eligible for any entity objects, the client is declined. If the client is determined to be eligible for an entity object, then a ranking process is used based on a risk grade, credit report, and/or other information that may be obtained from a credit bureau. The information obtained through the ranking process is used to populate a loan application and a risk grade is passed along to a digital commerce (DC) page of the digital platform. The client is able to use the DC page, which incorporates a graphical user interface, to customize the application. Customization of the application may be used to modify the loan structure tables, pricing tables, etc. and a loan calculator that is accessible via a third party platform may be used to facilitate this customization. In non-limiting examples, the client may be able to modify the payment amount by extending the term of the loan or the total amount borrowed. Various other customization and modification processes are also contemplated herein.

Once the client finalizes the customization process, the client then selects the product type and the loan terms. This process further populates the application with the final selections of the client, and the LOS is used to complete the underwriting process. The underwriting process utilizes a secure document exchange with an underwriting group that then returns a final underwriting decision that the client is declined, is approved, or that a counter offer is being submitted. An electronic communication is provided via the DC to the client, and the client may accept the entity object or reject the counter offer. The client may accept the entity object using an electronic signature that is provided via a third party platform.

This methodology 300 enables multi-channel product selection, transparency into financing options, and helps the client choose the financing product and terms that best meet their needs. The user may be notified whether or not they were approved for the entity object using various forms of electronic messaging. Such notification methods can include a push notification, an electronic mail message, a text message, a voicemail, and/or a phone call.

In some non-limiting examples, the backend system, which includes the LOS, may utilize user data stored to one or more database records. The user data can include, for example, (i) a user identifier; (ii) user contact data, including a mailing address or a geographic region where the user resides (e.g., a zip code, city, state); (iii) user source data, such as user telephone number data, user device IP Address data, an email address, or a social media account name; (iv) user demographic data, including the gender and age of a user; (v) one or more product identifiers that indicate the accounts or products currently held by a user (e.g., a checking account, a home loan, brokerage account, etc.); (vi) user resource availability data (e.g., balances for various product types or account types associated with, or held by, a user); (vii) average resource availability data that indicates the average value of products or account balances maintained by the user over a given time period (e.g., an average monthly balance for an account held by the user); (viii) transaction data that includes data and information relating to user transactions, such as payment amounts, dates when a transaction occurred, data that identifies other parties to the transaction (i.e., a payment recipient), and information identifying a category of expenditures for the transaction (i.e., groceries, transportation, etc.); (ix) average resource utilization volume data indicating the average number of transactions a user conducts using a given product over a given time period (e.g., the number of resource expenditures per month for a given account or accounts); (x) user online activity data indicating user attempts to log into the provider system to access user accounts or other activities performed by users online or through a dedicated mobile device software application; (xi) geographic location information; and/or various other user data.

Figure 4:
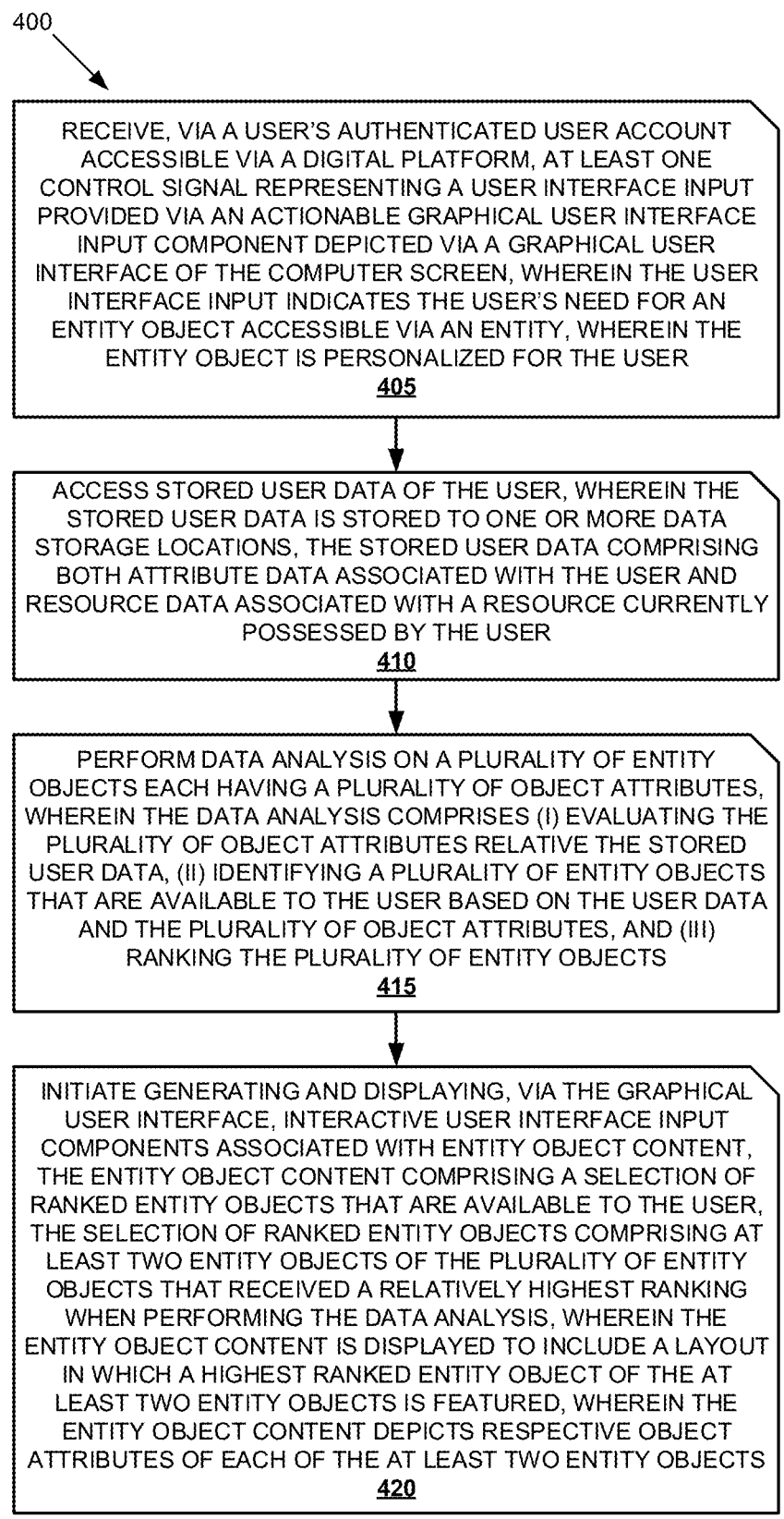
FIG. 4 depicts a block diagram of an example method for generating actionable graphical user interface input components to be depicted via a computer screen, in accordance with an embodiment of the present invention.

FIG. 4 depicts a block diagram of an example method 400 for generating actionable graphical user interface input components to be depicted via a computer screen, in accordance with an embodiment of the present invention. At block 405, at least one processor receives, via a user's authenticated user account accessible via a digital platform, at least one control signal representing a user interface input provided via an actionable graphical user interface input component depicted via a graphical user interface of the computer screen, wherein the user interface input indicates the user's need for an entity object accessible via an entity, wherein the entity object is to be personalized for the user.

At block 410, at least one processor accesses stored user data of the user, wherein the stored user data is stored to one or more data storage locations, the stored user data comprising both attribute data associated with the user and resource data associated with a resource currently possessed by the user.

At block 415, at least one processor performs data analysis on a plurality of entity objects each having a plurality of object attributes, wherein the data analysis comprises (i) evaluating the plurality of object attributes relative the stored user data, (ii) identifying a plurality of entity objects that are available to the user based on the user data and the plurality of object attributes, and (iii) ranking the plurality of entity objects. According to some embodiments, identifying the plurality of entity objects that are available to the user based on the user data and the plurality of object attributes is further based on determining that the user passes a risk grade, wherein the risk grade is based at least in part on a score attributed to the user data that represents a history of user actions.

In some embodiments, this data analysis is able to initially determine that there are no entity objects that would be available to the user, or perhaps only one entity object is found to be available to the user. If no entity objects are found to be available to the user, then the a notification is displayed via the graphical user interface that indicates that no entity objects have been identified as being available. If only one entity object is found to be available, then only the single entity object may be displayed.

At block 420, at least one processor initiates generating and displaying, via the graphical user interface, interactive user interface input components associated with entity object content, the entity object content comprising a selection of ranked entity objects that are available to the user, the selection of ranked entity objects comprising at least two entity objects of the plurality of entity objects that received a relatively highest ranking when performing the data analysis, wherein the entity object content is displayed to include a layout in which a highest ranked entity object of the at least two entity objects is featured, wherein the entity object content depicts respective object attributes of each of the at least two entity objects. In some embodiments the interactive user interface components include a respective customization input for each of the at least two entity objects, wherein the respective customization input is configured to facilitate, based on the user selecting the respective customization input, permitting the user to request a modification of an attribute of the plurality of object attributes of the entity object.

In some embodiments, an application for a desired entity object selected by the user is received, and one or more electronic notifications are transmitted that indicate the user's application was declined as part of an underwriting process. In some embodiments, the system initiates sending the one or more notifications, where the one or more notifications are selected from the group consisting of push notifications, an electronic mail message, a text message, a voicemail, and a phone call.

In some embodiments, the layout comprises a differentiated background color associated with the highest ranked entity object, the differentiated background color being a different background color than a respective background color of one or more other entity objects of the at least two entity objects. In some embodiments, comprises a differentiated background color associated with the highest ranked entity object, the differentiated background color being a different background color than a respective background color of one or more other entity objects of the at least two entity objects. In some embodiments, the layout includes a differentiated font size, background size, and/or other differentiating identifier used to feature the highest ranked entity object. In some embodiments, the respective object attributes are selected from the group consisting of an entity object quantity, an entity object term, an entity object rate, an entity object fee, an increment remittance amount, and an estimated time period for obtaining the entity object.

In some embodiments, the interactive user interface components include a respective requirements input for each of the at least two entity objects, wherein the respective requirements input is configured to facilitate, based on the user selecting the respective requirements input, accessing requirements that must be satisfied by the user in order to obtain the entity object. In some embodiments, the interactive user interface components include an options input configured to display, based on the user selecting the options input, at least one additional entity object other than the at least two entity objects.

In some embodiments, the system is used to determine that the user has performed, via the graphical user interface of the computer screen, an authentication process to access, via the digital platform, the user account, wherein the digital platform is managed by the entity, wherein the user account is associated with one or more existing entity objects serviced by the entity and attributed to the user. Based on the user performing the authentication process, the system provides the user with access to a plurality of account functionalities associated with the user account. In some embodiments, the providing includes displaying, via the graphical user interface, the actionable graphical user interface input component.

In some embodiments, the method 400 also includes receiving, via a user device associated with the computer screen, a user input of an interface component of the interactive user interface input components, the user input indicating selection of a selected entity object from the at least two entity objects. Based on receiving the user input, the method 400 includes populating an application form to apply for the selected entity object. A confirmation input to process application data included in the application form is received, and an electronic notification is transmitted to one or more electronic devices to facilitate verification of the application data included in the application form. Further, notification, via an electronic message, may be initiated, where the notification indicates an outcome of the verification of the application data, where the initiating includes transmitting the electronic message to the user device. In some embodiments, an encrypted digital authentication is received that validates the user's identity.

FIG. 5 depicts a block diagram of an example method 500 for facilitating displaying one or more graphical user interface components, in accordance with an embodiment of the present invention. At block 505, user data of a user that utilizes one or more entity objects is accessed, where the user data includes both attribute data associated with one or more attributes of the user and resource data associated with a resource currently possessed by the user. At block 510, the user data is analyzed to identify at least two entity objects that are available to the user and based thereon assign a respective value to each respective entity object of the at least two entity objects, wherein the value assigned is based at least in part on a history of user actions. In some embodiments, the at least two entity objects are initially determined to be available to the user, but this initial determination is subject to an underwriting process to confirm availability.

At block 515, the at least two entity objects are ranked based on the respective value assigned to each respective entity object. At block 520, the system initiates displaying, via a user interface of a user device, a graphical user interface comprising the one or more graphical user interface components, wherein the one or more graphical user interface components include respective inputs associated with each respective entity object, wherein the graphical user interface comprises a featured entity object of the at least two entity objects, the featured entity object having a relatively higher value compared to any other entity object of the at least two entity objects.

In some embodiments, the relatively higher value is based on the respective value assigned to each respective entity object. In some embodiments, the one or more entity objects utilized by the user include an entity object configured to securely store user resources. In some embodiments, a layout that comprises a the one or more graphical user interface components comprises a differentiated background color associated with the featured entity object, the differentiated background color being a different background color than a respective background color than any other entity object of the at least two entity objects. In some embodiments, the respective inputs are each associated with respective object attributes that are selected from the group consisting of an entity object quantity, an entity object term, an entity object rate, an entity object fee, an increment remittance amount, and an estimated time period for obtaining the entity object.

Figure 6:
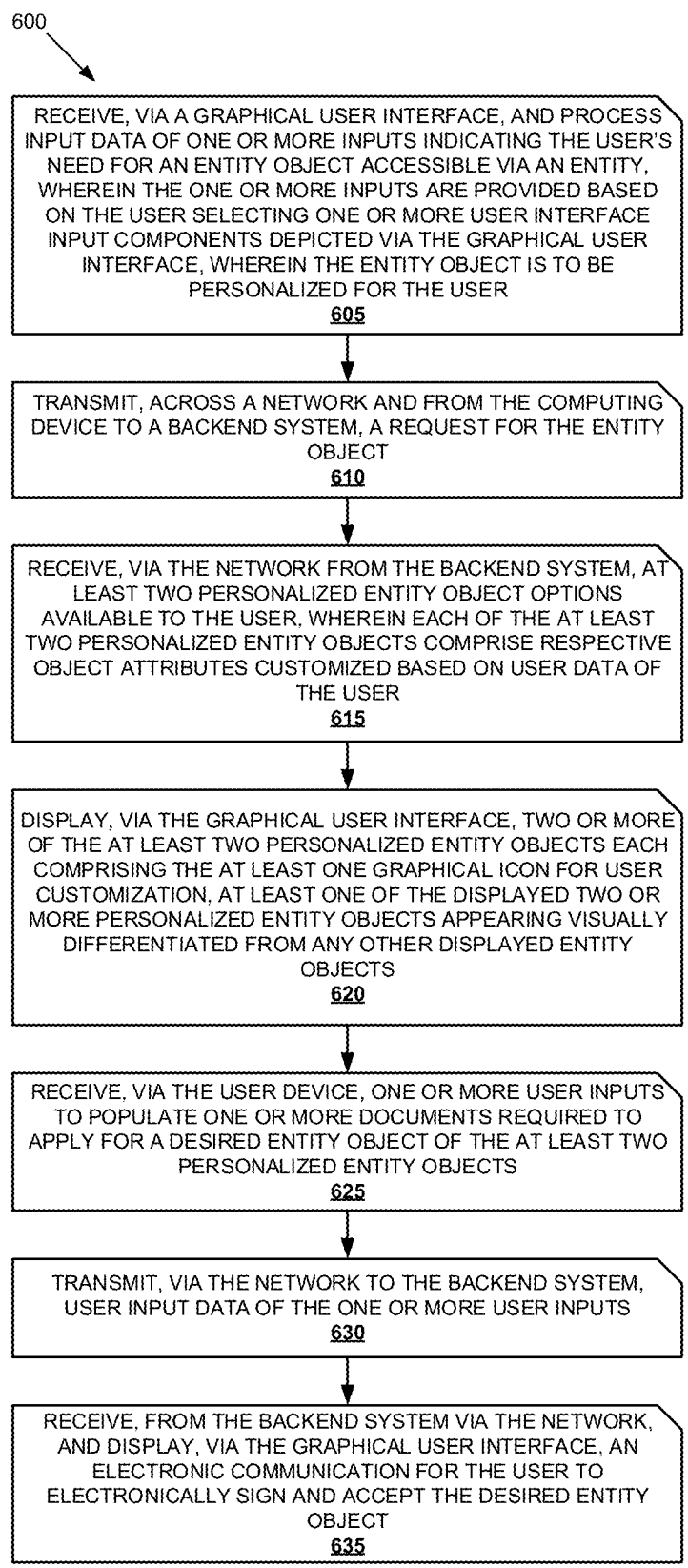
FIG. 6 depicts a block diagram of an example method for customized graphical user interface access graphically depicting at least one icon, in accordance with an embodiment of the present invention.

FIG. 6 depicts a block diagram of an example method 600 for customized graphical user interface access graphically depicting at least one icon, in accordance with an embodiment of the present invention. At block 605, the computing system receives, via a graphical user interface, and processes input data of one or more inputs indicating the user's need for an entity object accessible via an entity, wherein the one or more inputs are provided based on the user selecting one or more user interface input components depicted via the graphical user interface, wherein the entity object is to be personalized for the user. According to some embodiments, the one or more inputs include an electronic signature authorizing processing, by the backend system, the user data of the user to generate a summary report of the user's resource usage history (e.g., credit history).

At block 610, the computing system transmits, across a network and from the computing device to a backend system, a request for the entity object. At block 615, the computing system receives, via the network from the backend system, at least two personalized entity object options available to the user, wherein each of the at least two personalized entity objects comprise respective object attributes customized based on user data of the user. In some embodiments, the at least two personalized entity object options are selected by the backend system as part of a pre-approval process that evaluates risks to the entity if the user is provided with any one of the at least two personalized entity object options. Further, the pre-approval process may be at least partially based on a risk grade assigned to the user, wherein the risk grade is based on a score attributed the user's resource borrowing history. In some embodiments, the respective object attributes are selected from the group consisting of an entity object quantity, an entity object term, an entity object rate, an entity object fee, an increment remittance amount, and an estimated time period for obtaining the entity object. In some embodiments, the determination is an initial determination and the final determination in terms of approval is ultimately determined as part of an underwriting process.

At block 620, the computing system displays, via the graphical user interface, two or more of the at least two personalized entity objects each comprising the at least one graphical icon for user customization, at least one of the displayed two or more personalized entity objects appearing visually differentiated from any other displayed entity objects. According to various embodiments, the at least one of the displayed two or more personalized entity objects that appears visually differentiated from any other displayed entity objects comprises a differentiated background color. According to various embodiments, displaying the two or more of the at least two personalized entity objects further includes displaying a selectable icon configured to facilitate accessing at least one additional personalized entity object of the at least two personalized entity objects.

At block 625, the computing system receives, via the user device, one or more user inputs to populate one or more documents required to apply for a desired entity object of the at least two personalized entity objects. In some embodiments, the one or more documents are prepopulated by the backend system with a product type and one or more user-selected attributes of the object attributes customized based on the user data of the user.

At block 630, the computing system transmits, via the network to the backend system, user input data of the one or more user inputs. At block 635, the computing system receives, from the backend system via the network, and display, via the graphical user interface, an electronic communication for the user to electronically sign and accept the desired entity object.

In various embodiments, the method 600 further includes authenticating user authentication information provided by the user in order to access a digital platform, the digital platform being associated with the entity and used to service one or more existing entity objects attributed to the user, and based on the authenticating, provide access to the digital platform, wherein the input data is received via the graphical user interface that depicts entity information via the digital platform. In some embodiments, the system further receives a digital signature indicating the user's acceptance of the desired entity object, wherein the digital signature comprises an encrypted digital authentication validating the user's identity. In some alternative embodiments, the electronic communication may indicate that the user was declined as part of the underwriting process rather than approved.

Figure 7:
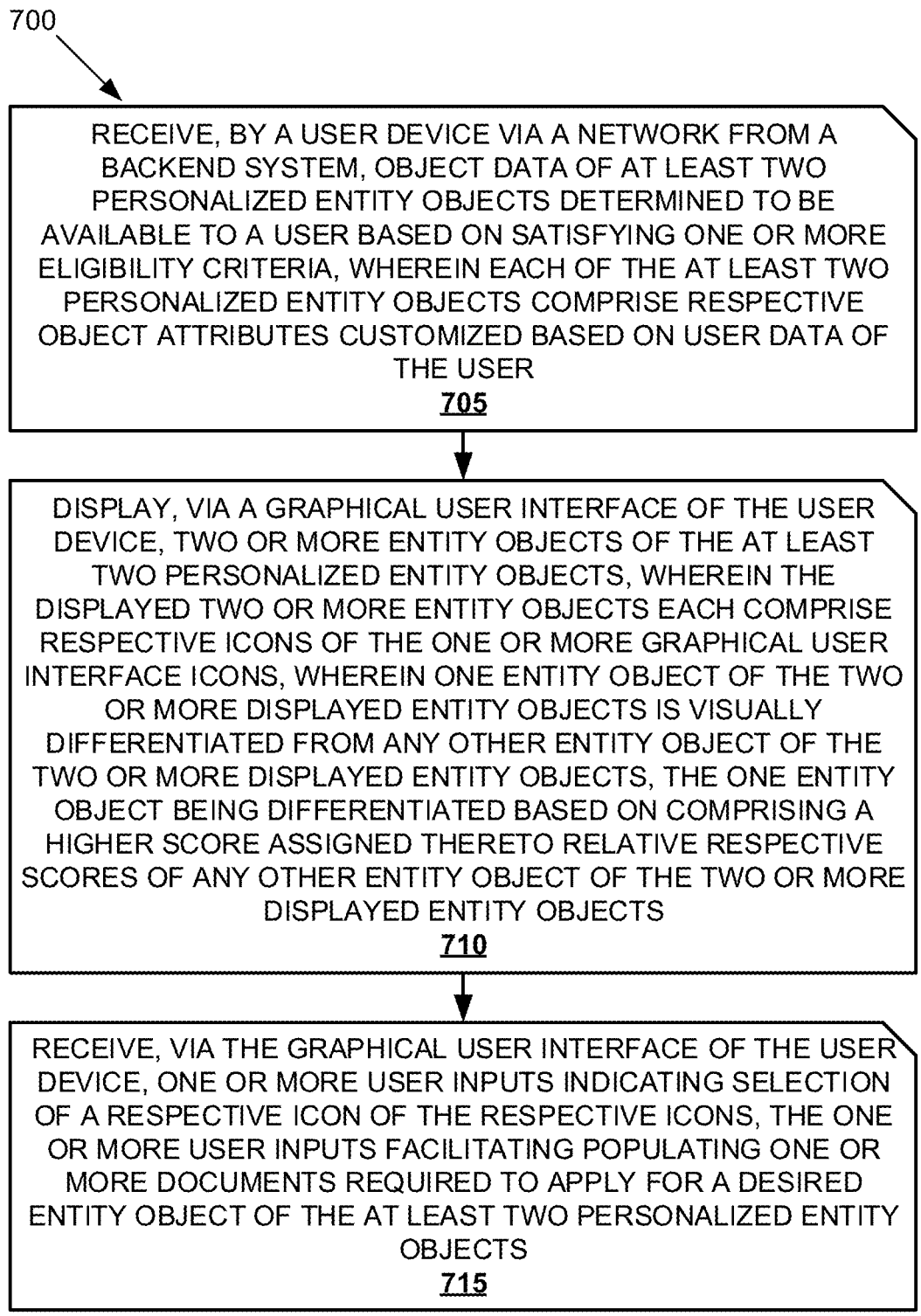
FIG. 7 depicts a block diagram of an example method for displaying one or more graphical user interface icons, in accordance with an embodiment of the present invention.

FIG. 7 depicts a block diagram of an example method 700 for displaying one or more graphical user interface icons, in accordance with an embodiment of the present invention. At block 705, the system receives, by a user device via a network from a backend system, object data of at least two personalized entity objects determined to be available to a user based on satisfying one or more eligibility criteria, wherein each of the at least two personalized entity objects comprise respective object attributes customized based on user data of the user. In some embodiments, this determination is only an initial determination that was derived as part of a pre-approval process, but the final determination is made during an underwriting process. At block 710, the system displays, via a graphical user interface of the user device, two or more entity objects of the at least two personalized entity objects, wherein the displayed two or more entity objects each comprise respective icons of the one or more graphical user interface icons, wherein one entity object of the two or more displayed entity objects is visually differentiated from any other entity object of the two or more displayed entity objects, the one entity object being differentiated based on comprising a higher score assigned thereto relative respective scores of any other entity object of the two or more displayed entity objects. In some embodiments, the respective object attributes are selected from the group consisting of an entity object quantity, an entity object term, an entity object rate, an entity object fee, an increment remittance amount, and an estimated time period for obtaining the entity object. In some embodiments, the higher score is assigned via the backend system. In some embodiments, the one entity object is visually differentiated using a different background color than any other object of the two or more displayed entity objects.

At block 715, the system receives, via the graphical user interface of the user device, one or more user inputs indicating selection of a respective icon of the respective icons, the one or more user inputs facilitating populating one or more documents required to apply for a desired entity object of the at least two personalized entity objects. In some embodiments, the one or more documents are then submitted for processing, and an indication is received that the user was ultimately declined for obtaining the desired entity object. This indication may be sent if, for example, the underwriting process determines that the user is ultimately not eligible for the desired entity object.

Figure 8:
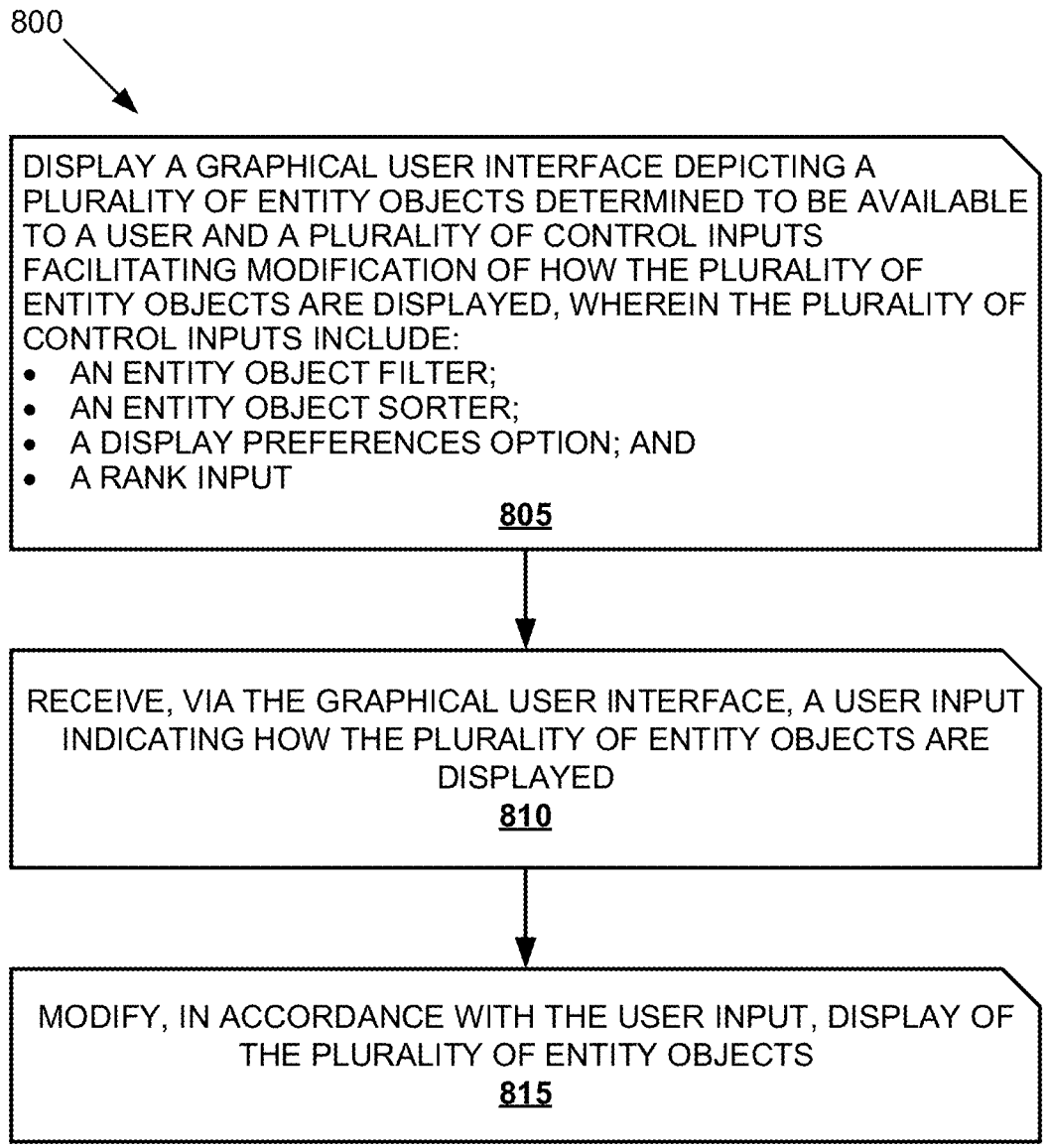
FIG. 8 depicts a block diagram of an example method for graphical user interface facilitating modification, in accordance with an embodiment of the present invention.

FIG. 8 depicts a block diagram of an example method 800 for graphical user interface facilitating modification, in accordance with an embodiment of the present invention. At block 805, a graphical user interface is displayed that depicts a plurality of entity objects determined to be available to a user and a plurality of control inputs facilitating modification of how the plurality of entity objects are displayed. The plurality of control inputs include an entity object filter, an entity object sorter, a display preferences option, and a rank input. The plurality of entity objects are initially determined to likely be available to the user based on the user satisfying eligibility criteria, wherein one eligibility criterion of the eligibility criteria includes a user type (e.g., a large business, a small business, an individual, etc.). The eligibility criteria can include a total resource amount (e.g., a total amount in savings, account balance, amount in a retirement account, etc.) attributed to the user that is being retained by an entity that facilitates providing the plurality of entity objects. In some embodiments, the eligibility criteria include an annual resource accumulation by the user such as, for example, an individual's wages, revenue of a company, investment income amount, etc. In some embodiments, the eligibility criteria include employment information of the user.

According to various embodiments, the entity object filter enables the user to narrow a quantity of the plurality of entity objects being displayed in accordance with an applicable rate (e.g., an interest rate) applied to each respective entity object of the plurality of entity objects. The entity object filter may also enable the user to narrow the quantity of the plurality of entity objects being displayed in accordance with a periodic remittance amount (e.g., a payment amount). In some embodiments, the entity object filter enables the user to narrow the quantity of the plurality of entity objects being displayed in accordance with a one-time initiation remittance amount (e.g., origination fees). In some embodiments, the entity object filter enables the user to narrow the quantity of the plurality of entity objects being displayed in accordance with an acquiring duration to obtain each respective entity object of the plurality of entity objects (e.g., time to fund). In some embodiments, the entity object filter enables the user to narrow the quantity of the plurality of entity objects being displayed in accordance with a servicing amount (e.g., finance charges). In some embodiments, each entity object includes a time period within which the total resources obtained via each entity object in addition to a gain amount (e.g., an interest amount) applied to each entity object are to be returned (e.g., a six month loan, a one year loan, a five year loan, a fifteen year loan, a thirty year loan, etc.), and the entity object filter enables the user to filter the options being displayed in accordance with a total remittance amount of the total resources and the gain throughout the time period (e.g., the total cost of the loan).

In various embodiments, the entity object sorter enables the user to sort the plurality of entity objects in accordance with at least one criterion selected from the group consisting of an applicable rate applied to each respective entity object of the plurality of entity objects (e.g., an interest rate), a one-time initiation remittance amount (e.g., origination fees), an acquiring duration to obtain each respective entity object of the plurality of entity objects (e.g., time to fund), and a servicing amount (e.g., finance charges). In some embodiments, the display preferences option enables the user to select a side-by-side comparison of details associated with at least two entity objects of the plurality of entity objects. In some embodiments, the rank input enables the user to to rank each respective entity object of the plurality of entity objects.

At block 810, a user input is received, via the graphical user interface, that indicates how the plurality of entity objects are displayed. At block 815, display of the plurality of entity objects is modified in accordance with the user input.

Figure 9:
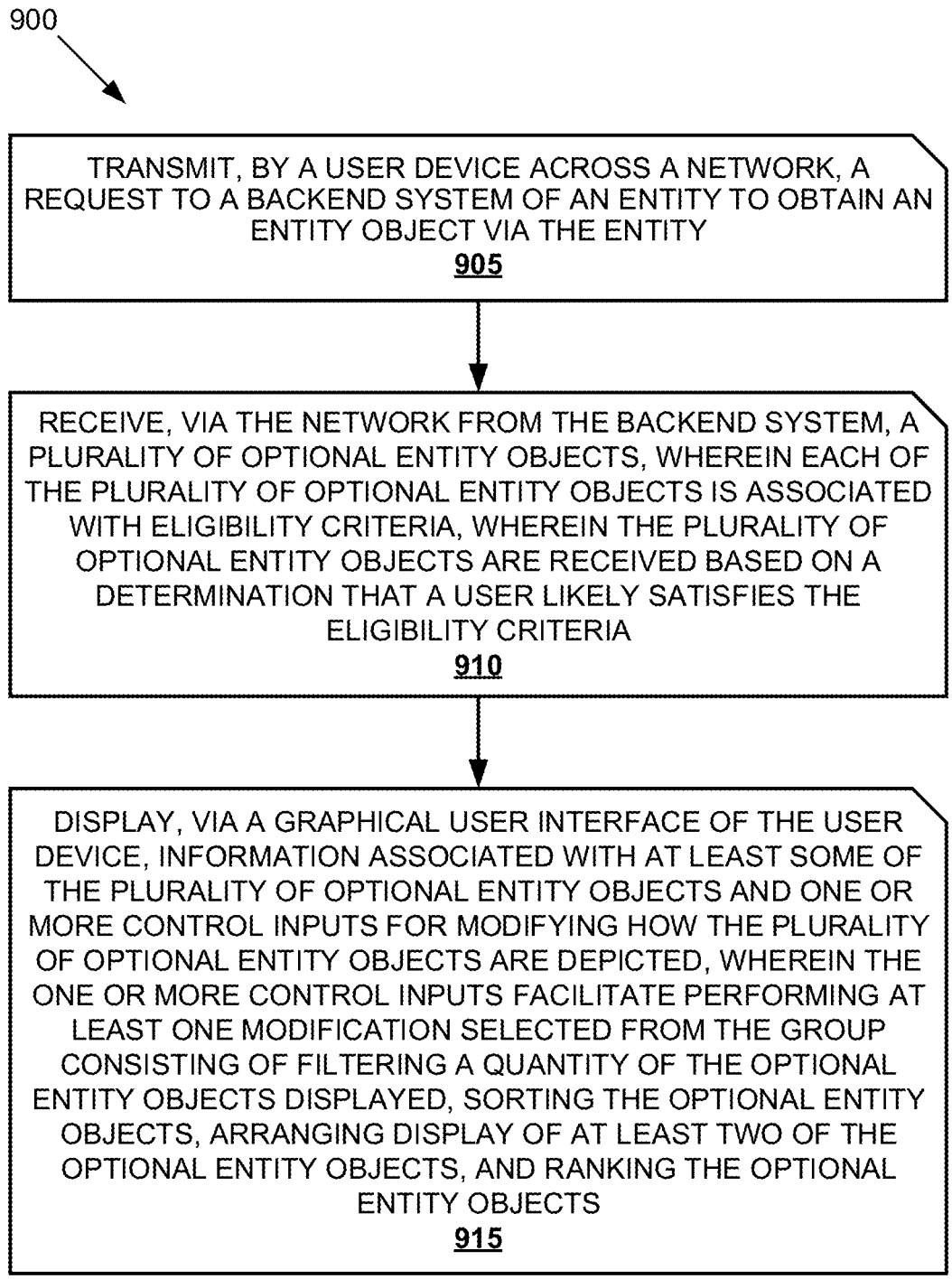
FIG. 9 depicts a block diagram of an example method, in accordance with an embodiment of the present invention.

FIG. 9 depicts a block diagram of an example method 900, in accordance with an embodiment of the present invention. At block 905, a request is transmitted by a user device across a network to a backend system of an entity to obtain an entity object via the entity. At block 910, a plurality of optional entity objects are received via the network from the backend system, where each of the plurality of optional entity objects is associated with eligibility criteria, where the plurality of optional entity objects are received based on a determination that a user likely satisfies the eligibility criteria. At block 915, information associated with at least some of the plurality of optional entity objects as well as one or more control inputs for modifying how the plurality of optional entity objects are depicted are displayed via a graphical user interface of the user device. The one or more control inputs facilitate performing at least one modification selected from the group consisting of filtering a quantity of the optional entity objects displayed, sorting the optional entity objects, arranging display of at least two of the optional entity objects, and ranking the optional entity objects. In some embodiments, the method 900 further includes modifying display of the optional entity objects in accordance with one or more user inputs provided via the one or more control inputs.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computing system for customized graphical user interface access graphically depicting at least one icon, comprising:
at least one processor; a communication interface communicatively coupled to the at least one processor; and a memory device storing executable code that, when executed, causes the at least one processor to: receive, via a graphical user interface, and process input data of one or more inputs indicating the user's need for an entity object accessible via an entity, wherein the one or more inputs are provided based on the user selecting one or more user interface input components depicted via the graphical user interface, wherein the entity object is to be personalized for the user;
transmit, across a network and from the computing device to a backend system, a request for the entity object; receive, via the network from the backend system, at least two personalized entity object options initially determined to be available to the user, wherein each of the at least two personalized entity objects comprise respective object attributes customized based on user data of the user; display, via the graphical user interface, two or more of the at least two personalized entity objects each comprising the at least one graphical icon for user customization, at least one of the displayed two or more personalized entity objects appearing visually differentiated from any other displayed entity objects; receive, via the user device, one or more user inputs to populate one or more documents required to apply for a desired entity object of the at least two personalized entity objects; transmit, via the network to the backend system, user input data of the one or more user inputs; and receive, from the backend system via the network, and display, via the graphical user interface, an electronic communication indicating the user was declined as part of an underwriting process, wherein displaying the two or more of the at least two personalized entity objects further includes displaying a selectable icon configured to facilitate accessing at least one additional personalized entity object of the at least two personalized entity objects.

2. The computing system of claim 1, wherein the at least two personalized entity object options are selected by the backend system as part of a pre-approval process that evaluates risks to the entity if the user is provided with any one of the at least two personalized entity object options.

3. The computing system of claim 2, wherein the pre-approval process is at least partially based on a risk grade assigned to the user, wherein the risk grade is based on a score attributed the user's resource borrowing history.

4. The computing system of claim 1, wherein the one or more documents are prepopulated by the backend system with a product type and one or more user-selected attributes of the object attributes customized based on the user data of the user.

5. The computing system of claim 1, wherein the one or more inputs include an electronic signature authorizing processing, by the backend system, the user data of the user to generate a summary report of the user's resource usage history.

6. The computing system of claim 1, wherein the at least one of the displayed two or more personalized entity objects that appears visually differentiated from any other displayed entity objects comprises a differentiated background color.

7. The computing system of claim 1, wherein the respective object attributes are selected from the group consisting of an entity object quantity, an entity object term, an entity object rate, an entity object fee, an increment remittance amount, and an estimated time period for obtaining the entity object.

8. The computing system of claim 1, wherein the executable code, when executed, further causes the at least one processor to: authenticate user authentication information provided by the user in order to access a digital platform, the digital platform being associated with the entity and used to service one or more existing entity objects attributed to the user; and based on the authenticating, provide access to the digital platform, wherein the input data is received via the graphical user interface that depicts entity information via the digital platform.

9. A computing system for displaying one or more graphical user interface icons, comprising: at least one processor; a communication interface communicatively coupled to the at least one processor; and a memory device storing executable code that, when executed, causes the at least one processor to: receive, by a user device via a network from a backend system, object data of at least two personalized entity objects initially determined to be available to a user based on satisfying one or more initial eligibility criteria, wherein each of the at least two personalized entity objects comprise respective object attributes customized based on user data of the user; display, via a graphical user interface of the user device, two or more entity objects of the at least two personalized entity objects, wherein the displayed two or more entity objects each comprise respective icons of the one or more graphical user interface icons, wherein one entity object of the two or more displayed entity objects is visually differentiated from any other entity object of the two or more displayed entity objects, the one entity object being differentiated based on comprising a higher score assigned thereto relative respective scores of any other entity object of the two or more displayed entity objects; and receive, via the graphical user interface of the user device, one or more user inputs indicating selection of a respective icon of the respective icons, the one or more user inputs facilitating populating one or more documents required to apply for a desired entity object of the at least two personalized entity objects; and submit the one or more documents for processing and receive an indication that the user was ultimately declined for obtaining the desired entity object, wherein displaying the two or more of the at least two personalized entity objects further includes displaying a selectable icon configured to facilitate accessing at least one additional personalized entity object of the at least two personalized entity objects.

10. The computing system of claim 9, wherein the respective object attributes are selected from the group consisting of an entity object quantity, an entity object term, an entity object rate, an entity object fee, an increment remittance amount, and an estimated time period for obtaining the entity object.

11. The computing system of claim 10, wherein the higher score is assigned via the backend system.

12. The computing system of claim 10, wherein the one entity object is visually differentiated using a different background color than any other object of the two or more displayed entity objects.

13. The computing system of claim 10, wherein the indication comprises an electronic communication selected from the group consisting of a push notification, an electronic mail message, a text message, a voicemail, and a phone call.

14. A computer-implemented method for customized graphical user interface access graphically depicting at least one icon, comprising:
receiving, via a graphical user interface, and process input data of one or more inputs indicating the user's need for an entity object accessible via an entity, wherein the one or more inputs are provided based on the user selecting one or more user interface input components depicted via the graphical user interface, wherein the entity object is to be personalized for the user; transmitting, across a network and from the computing device to a backend system, a request for the entity object; receiving, via the network from the backend system, at least two personalized entity object options initially determined to be available to the user, wherein each of the at least two personalized entity objects comprise respective object attributes customized based on user data of the user; displaying, via the graphical user interface, two or more of the at least two personalized entity objects each comprising the at least one graphical icon for user customization, at least one of the displayed two or more personalized entity objects appearing visually differentiated from any other displayed entity objects; receiving, via the user device, one or more user inputs to populate one or more documents required to apply for a desired entity object of the at least two personalized entity objects;
transmitting, via the network to the backend system, user input data of the one or more user inputs; and receiving, from the backend system via the network, and display, via the graphical user interface, an electronic communication indicating the user was declined as part of an underwriting process, wherein displaying the two or more of the at least two personalized entity objects further includes displaying a selectable icon configured to facilitate accessing at least one additional personalized entity object of the at least two personalized entity objects.

15. The computer-implemented method of claim 14, wherein the at least two personalized entity object options are selected by the backend system as part of a pre-approval process that evaluates risks to the entity if the user is provided with any one of the at least two personalized entity object options.

16. The computer-implemented method of claim 15, wherein the pre-approval process is at least partially based on a risk grade assigned to the user, wherein the risk grade is based on a score attributed the user's resource borrowing history.

17. The computer-implemented method of claim 14, wherein the one or more documents are prepopulated by the backend system with a product type and one or more user-selected attributes of the object attributes customized based on the user data of the user.

18. The computer-implemented method of claim 14, wherein the one or more inputs include an electronic signature authorizing processing, by the backend system, the user data of the user to generate a summary report of the user's resource usage history.

19. The computer-implemented method of claim 14, wherein the at least one of the displayed two or more personalized entity objects that appears visually differentiated from any other displayed entity objects comprises a differentiated background color.

* * * * *